(12) United States Patent
Smith et al.

(10) Patent No.: US 12,159,233 B2
(45) Date of Patent: Dec. 3, 2024

(54) FEEDBACK DISCRIMINATOR

(71) Applicant: International Business Machines Corporation, Armonk, NY (US)

(72) Inventors: Aaron T. Smith, Raleigh, NC (US); Rebecca Rose James, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1303 days.

(21) Appl. No.: 16/676,632

(22) Filed: Nov. 7, 2019

(65) Prior Publication Data

US 2021/0142180 A1    May 13, 2021

(51) Int. Cl.
*G06F 16/23* (2019.01)
*G06N 3/045* (2023.01)
*G06N 3/047* (2023.01)
*G06N 3/088* (2023.01)

(52) U.S. Cl.
CPC ......... *G06N 3/088* (2013.01); *G06F 16/2365* (2019.01); *G06N 3/045* (2023.01); *G06N 3/047* (2023.01)

(58) Field of Classification Search
CPC ........ G06N 3/088; G06N 3/045; G06N 3/047; G06F 16/2365; G06F 16/3329
See application file for complete search history.

(56) References Cited

U.S. PATENT DOCUMENTS 9,436,738 B2    9/2016  Ehsani et al.
10,255,274 B1   4/2019  Schilling et al.
2007/0250563 A1* 10/2007 Lo .................. G06F 16/986
                                                707/E17.118
2014/0304833 A1  10/2014  Gujar et al.
2014/0323142 A1  10/2014  Rodriguez et al.
(Continued)

FOREIGN PATENT DOCUMENTS

WO    2017158058 A1    9/2017

OTHER PUBLICATIONS

Wang ("Sentigan: Generating sentimental texts via mixture adversarial networks") Proceedings of the Twenty-Seventh International Joint Conference on Artificial Intelligence (IJCAI-18) (Year: 2018).*
(Continued)

*Primary Examiner* — Kakali Chaki
*Assistant Examiner* — Su-Ting Chuang
(74) *Attorney, Agent, or Firm* — Daniel M. Yeates

(57) ABSTRACT

Disclosed is a computer implemented method to identify relevant feedback. The method includes training, with a set of training data, a generative adversarial network (GAN), wherein the GAN includes a generator and a discriminator, and the set of training data is comprised of a plurality of feedback, each instance of feedback includes a value in a plurality of categories, the categories including a positivity value, and a validity value. The method also includes receiving, from a user, a new instance of feedback. The method further includes determining, by the discriminator, a first validity value and a first positivity value of the new instance of feedback. The method includes updating, in response to the first validity value being valid, and the first positivity value being negative, the GAN. The method further includes, displaying the new instance of feedback.

20 Claims, 6 Drawing Sheets

(56) References Cited

U.S. PATENT DOCUMENTS

| | | |
|---|---|---|
| 2015/0095031 A1 | 4/2015 | Conkie et al. |
| 2019/0130903 A1 | 5/2019 | Sriram et al. |

OTHER PUBLICATIONS

Gunawan ("EzLog: Data visualization for logistics") Singapore Management University Institutional Knowledge at Singapore Management University (Year: 2019).*

Olabiyi ("Adversarial Bootstrapping for Dialogue Model Training") arXiv:1909.00925v2 [cs.CL] Sep. 4, 2019 (Year: 2019).*

Aghakhani ("Detecting Deceptive Reviews Using Generative Adversarial Networks") 2018 IEEE Symposium on Security and Privacy Workshops (Year: 2018).*

Sun ("Emotional Human Machine Conversation Generation Based on SeqGAN") 2018 First Asian Conference on Affective Computing and Intelligent Interaction (ACII Asia) (Year: 2018).*

Rios ("Closed-Loop Memory GAN for Continual Learning") ArXiv:1811.01146v2 [cs.LG] Jul. 28, 2019 (Year: 2019).*

Yi ("Towards coherent and engaging spoken dialog response generation using automatic conversation evaluators") arXiv:1904.13015v3 [cs.CL] Sep. 21, 2019 (Year: 2019).*

Burtsev ("The First Conversational Intelligence Challenge") The NIPS '17 Competition: Building Intelligent Systems (Year: 2017).*

Anonymous, "Reinforcement Learning for Fuzzing Testing Techniques," An IP.com Prior Art Database Technical Disclosure, IP.com No. IPCOM000252021D, Dec. 13, 2017, 36 pages. https://ip.com/IPCOM/000252021.

Anonymous, "Applying machine learning techniques to determine product risks," An IP.com Prior Art Database Technical Disclosure, IP.com No. IPCOM000256883D, Jan. 7, 2019, 29 pages. https://ip.com/IPCOM/000256883.

Anonymous, "Retrospective User Input Inference and Correction," An IP.com Prior Art Database Technical Disclosure, IP.com No. IPCOM000252365D, Jan. 5, 2018, 38 pages. https://ip.com/IPCOM/000252365.

Anonymous, "Machine Learning to Predict Advertisement Targeting Solutions," An IP.com Prior Art Database Technical Disclosure, IP.com No. IPCOM000252091D, Dec. 15, 2017, 35 pages. https://ip.com/IPCOM/000252091.

Luo et al., "Learning Online Alignments with Continuous Rewards Policy Gradient," arXiv:1608.01281v1, Aug. 3, 2016, 9 pages, (29th Conference on Neural Information Processing Systems (NIPS 2016)).

Chung, J. S., "Visual recognition of human communication," D. Phil. Thesis, University of Oxford, 2017, 155 pages.

Vukotic, V., "Deep Neural Architectures for Automatic Representation Learning from Multimedia Multimodal Data," Artificial Intelligence [cs.AI], INSA de Rennes, 2017, 125 pages. https://tel.archives-ouvertes.fr/tel-01629669v2.

Stillman, J., "Here's How to Spot Fake Online Reviews With 90 Percent Accuracy, According to Science," Inc., Aug. 25, 2017, 3 pages. https://www.inc.com/jessica-stillman/heres-how-to-spot-fake-online-reviews-with-90-perc.html.

Long et al., "Opinion Spam Recognition Method for Online Reviews Using Ontological Features," arXiv:1807.11024, Received: Mar. 31, 2014, Accepted: 2014, 15 pages https://arxiv.org/ftp/arxiv/papers/1807/1807.11024.pdf.

Fedus et al., "MaskGan: Better Text Generation via Filling in the" arXiv:1801.07736v3, Mar. 1, 2018, Published as a conference paper at ICLR 2018, pp. 1-17. https://arxiv.org/pdf/1801.07736.pdf.

"Deception Detection via Text Analysis," Secure Systems Group, Printed: Aug. 21, 2019, 3 pages. https://ssg.aalto.fi/research/projects/deception-detection-via-text-analysis/.

Grondahl et al., "All You Need is "Love": Evading Hate Speech Detection," arXiv:1808.09115v3, Nov. 5, 2018, 11 pages. https://arxiv.org/pdf/1808.09115.pdf.

"Generative adversarial network," Wikipedia, Printed: Aug. 21, 2019, 8 pages. https://en.wikipedia.org/wiki/Generative_adversarial_network.

Budhkar, A., "Generative Adversarial Networks (GANS) for Text Using WORD2VEC: Part 1," Blog, Mar. 26, 2018, 7 pages. https://akshaybudhkar.com/2018/03/26/generative-adversarial-networks-gans-for-text-using-word2vec/.

Mell et al., "The NIST Definition of Cloud Computing", Recommendations of the National Institute of Standards and Technology, U.S. Department of Commerce, Sep. 2011, 7 pages.

\* cited by examiner

FEEDBACK DISCRIMINATOR

BACKGROUND

The present disclosure relates to machine learning, and, more specifically, to using machine learning to discriminate between relevant and irrelevant feedback.

Conversational solutions are becoming more prevalent in our society. Users are less frequently greeted by a human when contacting a service department of an institution. It is likely the user will communicate with a conversational solution virtual agent, or other non-human interactive system.

SUMMARY

Disclosed is a computer implemented method to identify relevant feedback. The method includes training, with a set of training data, a generative adversarial network (GAN), wherein the GAN includes a generator and a discriminator, and the set of training data is comprised of a plurality of feedback, each instance of feedback includes a value in a plurality of categories, the categories including a positivity value, and a validity value. The method also includes receiving, from a user, a new instance of feedback. The method further includes determining, by the discriminator, a first validity value and a first positivity value of the new instance of feedback. The method includes updating, in response to the first validity value being valid, and the first positivity value being negative, the GAN. The method further includes, displaying the new instance of feedback. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
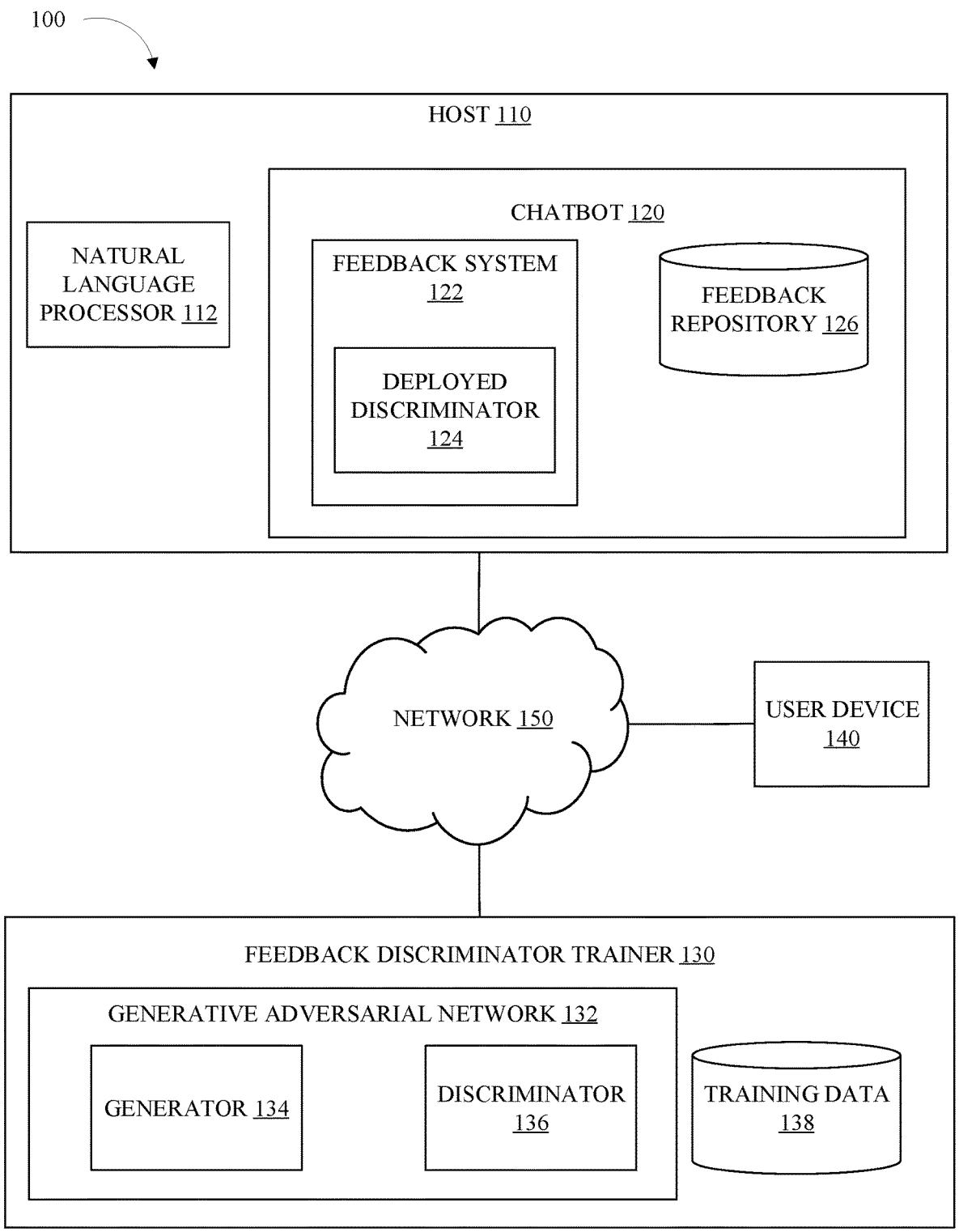
FIG. 1 illustrates a functional diagram of a computing environment suitable for operation of a feedback discriminator, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to machine learning, and, more specifically, to using machine learning to discriminate between relevant and irrelevant feedback. Aspects of the present disclosure may be better appreciated in light of the aforementioned applications.

Conversational solutions are becoming more prevalent in our society. Users are less frequently greeted by a human when we contact a service department of an institution. Rather, it is likely the user communicate with a conversational solution, chatbot, virtual agent, or other interactive system. These systems are trained to answer common questions, and complete common tasks. At times, the systems do not understand the question clearly or are confused by the intent of the question and provides an inadequate/incorrect answer. In this case, the end user can provide feedback on whether the system has understood the user's intent. Automation of this feedback process may be cumbersome because the feedback users provide must first be validated. For example, if a user gets back an answer that they don't like/agree with, they may provide negative feedback, but the feedback would not be related to the system or its operation. In other cases, users may provide positive feedback that may not be pertinent to conversation. Either way, feedback would need to be evaluated for validity and "truthfulness" before incorporating it into the system. Using this data for analytics without further review could prove detrimental to the performance of the system.

Generally, before this feedback can be made meaningful, it must be reviewed and incorporated into the interactive system. The reviewing process may include a human gathering the feedback, reading all the feedback, determining the feedback is valid, and doing something with the results. Depending on the quantity of feedback, it can become quite cumbersome for a subject matter expert (SME) to filter through the content to find valid (or relevant) feedback. Valid feedback may include recommendations for areas of improvement, evidence that the system did or did not understand the intent of the user, and/or whether the system was able to complete the user's objective. Being able to quickly iterate on and incorporate the user's feedback is critical to improving the performance of the system.

It is important for experts to filter content for validity and "truthfulness" and generate rules to automate this part of the process. For large scale system, it is nearly impossible for a developer or SME to quickly sort through the feedback, determine which is relevant and irrelevant, and then incorporate changes to the system based on the relevant feedback.

Embodiments of the present disclosure include a system and method to autonomously sort, validate, and/or incorporate feedback into a system. In some embodiments, the incorporated feedback may improve user experience almost immediately (e.g., before the next customer interaction).

In some embodiments, the feedback is sorted validated and/or incorporated using a generative adversarial network (GAN). A GAN is a machine learning system that includes two neural networks, a generating network, and a validating network. The two neural networks compete with each other. The validating network may be a classifier type network, and it will evaluate data. The generating network generates data such that the discriminator interprets the data in a specific way (e.g., that the generated data is actually feedback from a user).

In some embodiments, the GAN is trained to an initial state using a set of training data. The training data may be generated from previously received feedback. In some embodiments, the feedback is received by a feedback system. The feedback system may include any method of receiving and storing data from a user. It may include written feedback (e.g., chatbot, comments, etc.), audible feedback (e.g., verbal chatbot, tonal, volume, etc.), biometric feedback (e.g., smiling, frowning, etc.), and other types of feedback.

In some embodiments, a feedback system classifies, by one or more categories, the received feedback. In some embodiments, the feedback is classified by one or more determined intents. The determined intent is a determination, based on context of the utterance, of the actual intent of the user (e.g., customer), or what the utterance from the customer is intending to achieve. For example, if a user asks a chatbot "how do I check my account balance?", the chatbot could determine an intent of "check balance." There may be multiple intents, continuing the above example, a second intent could be "request help" or "navigate website." In some embodiments, the feedback is classified as positive or negative feedback. Positive feedback indicates the user is achieved their intended purpose, and/or the chatbot determined the correct intent. Continuing with the example, in response to the question, the chatbot may show a list of instruction showing how to check an account balance. After the instruction, the chatbot may ask "is this what you were looking for?" with the option to select a thumbs up and a thumbs down, or may contain some form of a rating scale.

In some embodiments, the feedback is categorized as valid or invalid. In some embodiments, an SME determines whether feedback is valid or invalid (relevant or irrelevant). Valid feedback is when the utterance, the intent, and the feedback is usable to improve and/or change the system. Continuing the example above, if the user selected the thumbs up after determining the instructions provided were the correct instruction, that may be valid feedback. As another example, if, after a call, the customer leaves a comment that says, "I do not like banks," that may be irrelevant, as it is likely not related to an intent. In some embodiments, the feedback marked as valid or invalid by an SME constitutes the initial set training data.

In some embodiments, the GAN is trained in a feedback discriminator trainer. In some embodiments, GAN is trained by the training data. The training may allow the discriminator to determine the intent and the validity of the feedback. In some embodiments, the negative feedback in the training data is used to train the generator. The generator may use the negative feedback to generate additional possibilities (e.g., future feedback, new feedback) of negative feedback. In some embodiments, new utterances of feedback are fed through the discriminator. If the discriminator determines they are valid negative feedback, the new feedback may be added to the ground truth (e.g., updated training data).

In some embodiments, a copy of the discriminator is sent from the GAN to the feedback system. This may be a deployed discriminator. The deployed discriminator may be a copy of the discriminator. Having a copy in the feedback system allows for prompt classification of new feedback. As feedback is received and classified, it may be sent to the GAN to and the GAN (both the generator and the discriminator) may be updated based on the new feedback.

The aforementioned advantages are example advantages, and embodiments exist that can contain all, some, or none of the aforementioned advantages while remaining within the spirit and scope of the present disclosure.

Referring now to various embodiments of the disclosure in more detail, FIG. 1 is a representation of a computing environment 100, that is capable of running a feedback discriminator in accordance with one or more embodiments of the present disclosure. Many modifications to the depicted environment may be made by those skilled in the art without departing from the scope of the disclosure as recited by the claims.

Computing environment 100 includes host 110, feedback discriminator trainer 130, user device 140, and network 150. Network 150 can be, for example, a telecommunications network, a local area network (LAN), a wide area network (WAN), such as the Internet, or a combination of the three, and can include wired, wireless, or fiber optic connections. Network 150 may include one or more wired and/or wireless networks that are capable of receiving and transmitting data, voice, and/or video signals, including multimedia signals that include voice, data, and video information. In general, network 150 may be any combination of connections and protocols that will support communications between host 110, feedback discriminator trainer 130, user device 140, and other computing devices (not shown) within computing environment 100. In some embodiments, host 110, feedback discriminator trainer 130, and user device 140 may include a computer system, such as the computer system of FIG. 4.

Host 110 can be a standalone computing device, a management server, a web server, a mobile computing device, or any other electronic device or computing system capable of receiving, sending, and processing data. In other embodiments, host 110 can represent a server computing system utilizing multiple computers as a server system, such as in a cloud computing environment. In some embodiments, host 110 represents a computing system utilizing clustered computers and components (e.g., database server computers, application server computers, etc.) that act as a single pool of seamless resources when accessed within computing environment 100. In some embodiments host 110 includes chatbot 120, and natural language processor (NLP 112)

NLP 112 can be any combination of hardware and/or software configured to convert input from a user into machine readable code. In some embodiments, NLP receives utterances from the user. NLP 112 may identify key words and/or phrases. In some embodiments, NLP 112 identifies one or more intents for the utterances.

Chatbot 120 can be any combination of hardware and/or software configured to interact with a user (or customer). In some embodiments, the interaction may occur in real time. In real time means as if interacting by having a conversation with a human. In some embodiments, chatbot 120 is a messaging system (e.g., chat, email, etc.). In some embodiments, chatbot 120 is a telephone system.

In some embodiments, the interaction is delayed. For example, a website may post a recipe, and the comments may be the interaction. The comment may be posted anytime after the recipe is sent to the user. In some embodiments, chatbot 120 includes feedback system 122 and feedback repository 126.

Feedback system 122 can be any combination of hardware and/or software configured to receive and store feedback from a user. In some embodiments, the feedback is received by chatbot 120. In some embodiments, feedback system 122 include NLP 112.

In some embodiments, feedback system 122 organizes feedback. Organizing the feedback may include identifying one or more intents of the feedback. All feedback with a common intent may be grouped together. In some embodiments, feedback system 122 actively obtains feedback. Actively may include asking/prompting the user to provide feedback. Examples of active feedback may include having a feedback input box, a feedback checkbox (e.g., thumbs up, thumbs down, etc.), text prompt, voice prompts, and other similar active methods. In some embodiments, feedback system 122 passively collects feedback. Passive feedback may include tonal analysis (e.g., does the user sound frustrated), speed of response, biometric analysis (e.g., facial expression, blood pressure, etc.) whether the user must repeatedly ask for help, and other passive methods. In some embodiments, feedback system 122 includes deployed discriminator 124.

Deployed discriminator 124 can a neural network configured to classify new feedback. In some embodiments, classifying includes determining a relevancy value (e.g., relevant or irrelevant) and a positivity value (e.g., positive or negative) of new feedback. In some embodiments, deployed discriminator 124 is consistent with discriminator 136. In some embodiments, deployed discriminator 124 is a copy of discriminator 136. The copy may be sent to feedback system 120 in response to discriminator 136 being updates (or retrained). The updating may be based on new feedback analyzed by deployed discriminator 124.

Feedback repository 126 can be any combination of hardware and/or software that can store feedback for an extended period of time. The period of time may be an absolute period (e.g., forever, 5 years), a relative period of time (relative to some event), or event-driven, (e.g., a time it takes for a particular number of responses in a first in first out method). In some embodiments, feedback repository includes all the feedback (e.g., positive and negative, valid and invalid, etc.) received by chatbot 120.

Feedback discriminator trainer 130 can be any combination of hardware and software configured analyze feedback. The analysis may include determining identifying one or more categories of the feedback. In some embodiments, the category is selected from a pre-determined list of potential categories. For example, one group of categories may include positive feedback and negative feedback. Another may include valid or invalid. In some embodiments, the determination is made based on the one or more intents of the utterance, where the feedback is received in response to the utterance. In some embodiments, feedback discriminator trainer 130 is included within host 110, and/or chatbot 120. In some embodiments, feedback discriminator trainer 130 includes a generative adversarial network GAN 132, and training data 138.

Training data 138 can be a set of data that is used to train and or update GAN 132. In some embodiments, training data is comprised of a plurality of feedback elements. Each instance of feedback may include intents, how obtained, where obtained, type (e.g., positive or negative), and other similar data. In some embodiments, the training data is updated. In some embodiments, the updates are based on new feedback. In some embodiments, the updates are based on a determination made by GAN 132.

In some embodiments, training data 138 is generated by an SME. The SME may have collected feedback from chatbot 120. In some embodiments, the SME determines if the feedback is valid or invalid, and/or positive or negative. In some embodiments, training data 138 is organized based on the SME determinations. For example, positive feedback may be grouped (or stored) with other positive feedback, and/or valid feedback with other valid feedback.

In some embodiments, training data 138 includes ground truth. The ground truth may include an updated set of training data. As feedback discriminator learns, it may alter/update how it classifies data. In some embodiments, the ground truth is used to update GAN 132.

GAN 132 can be any machine learning system configured analyze and categorize feedback. In some embodiments, GAN 132 is trained by training data 138. In some embodiments, GAN 132 includes ground truth. The ground truth may be updated by GAN 132 and the updated ground truth may update the learning models. In some embodiments, GAN 132 includes generator 134 and discriminator 136.

Discriminator 136 is a neural network configured to determine if feedback is valid or invalid (relevant or irrelevant). Neural networks are discussed in further detail in relation to FIG. 3 below. The neural network may be trained by a set of training data and based on the one or more of the actions of the user (e.g., asking a question), the intents linked to the utterance, and the feedback provided by the user. In some embodiments, the discriminator will output whether the feedback is valid or invalid.

In some embodiments, discriminator 136 is trained by training data 138. In some embodiments, discriminator 136 is trained by a subset of the data in training data 138. For example, only feedback the SME determined to be valid may be used to train discriminator 136.

Generator 134 is a neural network configured to generate data. In some embodiments, the generated data is based on the training data. In some embodiments, the generated data mimics true data. The generated data is intended to imitate real feedback. The generated data may include phrases similar to feedback that has previously been received. In some embodiments, the generated data is intended to be passed off as real negative feedback provided by a user. Real, in this context, means feedback generated by a user.

User device 140 can be of any of a number of different data processing systems including client computing devices, server computing devices, a tablet computer, laptop computer, telephone or other communication device, a personal digital assistant (PDA), or the like. In some illustrative examples, user device 140 may be a portable computing device that is configured with flash memory to provide non-volatile memory for storing operating system files and/or user-generated data. In various embodiments, user device 140 includes software, hardware, and other components to provide feedback, via network 150, to feedback discriminator trainer 130, and/or chatbot 120.

Figure 2:
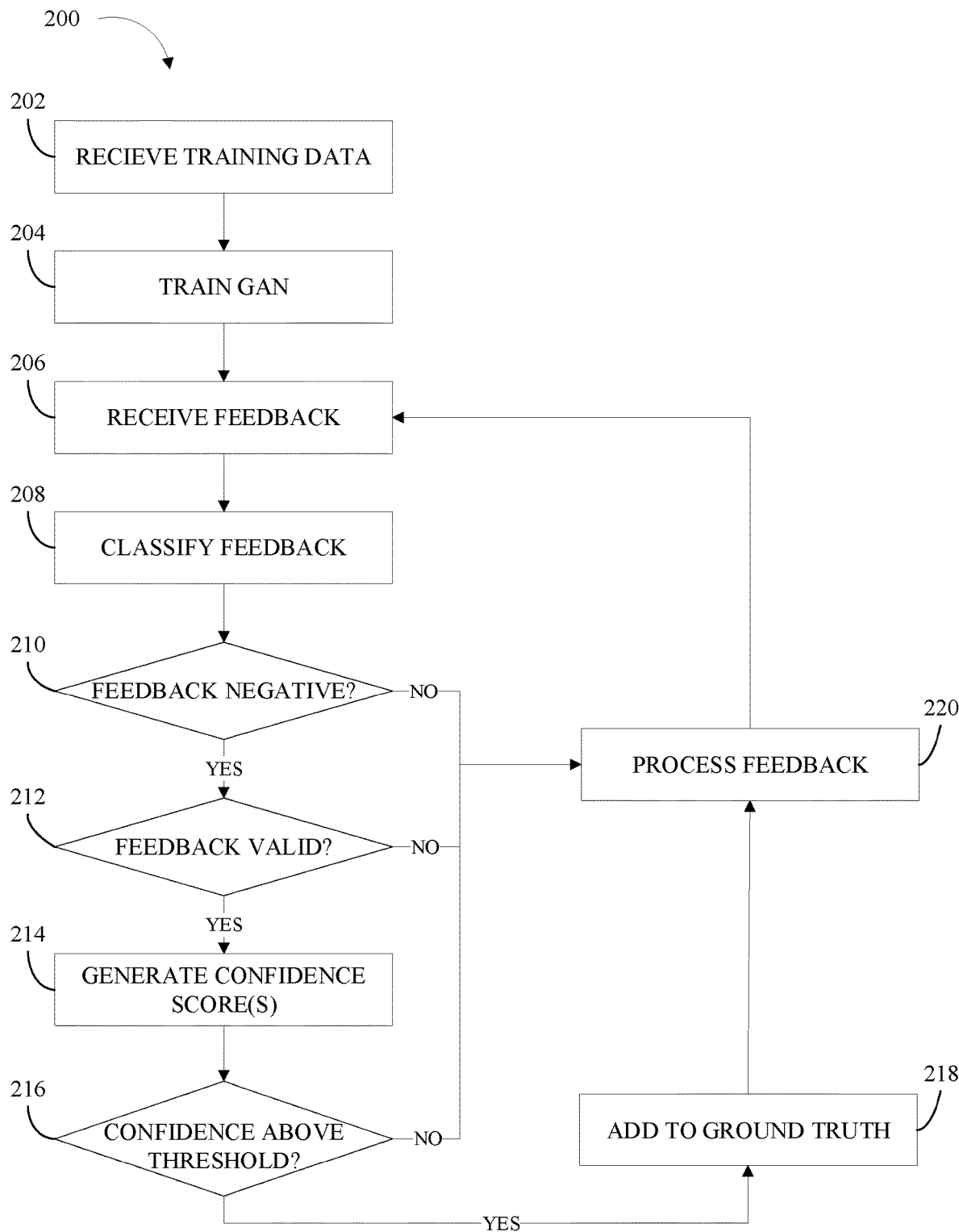
FIG. 2 illustrates a flow chart of an example method to identify and incorporate relevant negative feedback into a learning model, in accordance with some embodiments of the present disclosure.

FIG. 2 depicts a flowchart of an example method, method 200, for identifying and incorporating relevant feedback that can be performed in a computing environment (e.g., computing environment 100 and/or host 110). One or more of the advantages and improvements described above for identifying and incorporating relevant feedback may be realized by the method 200, consistent with various embodiments of the present disclosure.

Method 200 can be implemented by one or more processors, feedback discriminator trainer 130, host 110, and/or chatbot 120, and/or a different combination of hardware and/or software. In various embodiments, the various operations of method 200 are performed by one or more of host 110, chatbot 120, and feedback discriminator trainer 130. For illustrative purposes, the method 200 will be described as being performed by feedback discriminator trainer 130.

At operation 202, feedback discriminator trainer 130 receives (define, generates, accepts, determines) training data. In some embodiments, the training data is received from a SME. In some embodiments, the training data includes feedback. The feedback may be organized by each instance of feedback. One chatbot session may include several instances of feedback. For example, such feedback may be each time a user selects as thumbs up or thumbs down. The feedback may have been obtained from feedback system chatbot 120, and/or feedback system 122. In some embodiments, the feedback is categorized.

In some embodiments, each instance of feedback includes at least one intent. The intent may be any category that represents a goal or task of the user for the interaction. Each instance of feedback may also be classified as positive or negative feedback, and as relevant or irrelevant. Positive feedback may indicate that chatbot 120 correctly assisted the user. This may include understanding a user request, and/or resolving (or completing) the request. Relevant feedback may indicate the intent is related to the feedback. For example, if an intent is "activate credit card", and the feedback is "I don't like talking to machines", then that feedback may be irrelevant. There may be any combination of relevant/irrelevant and positive/negative feedback. In some embodiments, the initial determinations of relevance and/or positivity of the feedback may be made by the SME.

At operation 204, feedback discriminator trainer 130 trains GAN 132. In some embodiments, GAN 132 is trained by the training data. The training may allow GAN 132 to determine whether future feedback is positive or negative and/or relevant or irrelevant. In some embodiments, GAN 132 is trained to determine the intent of the feedback. In some embodiments, GAN 132 is trained to make determines based on an intent linked with the feedback.

In some embodiments, training GAN 132 includes training generator 134 and training discriminator 136. In some embodiments, generator 134 is trained with a subset of the training data. The subset may include invalid feedback from the training data. This will allow the generator to learn to mimic negative feedback. In some embodiments, discriminator 136 is trained a subset of the training data. The subset may include valid feedback from the training data. This will allow the generator to learn to distinguish valid from invalid data.

In some embodiments, the training includes generator 134 generating fake feedback. Fake feedback can be any utterance that imitates an utterance by a user. The fake feedback is intended to be classified by discriminator 136 as valid feedback. The fake feedback, in response to being generated, is fed to discriminator 136. In some embodiments, the training includes discriminator 136 processing the fake feedback. In some embodiments, discriminator 136 determines if the feedback is fake. Discriminator 136 can return the results of the processing to generator 134. This may allow generator 134 to alter how it generates fake feedback, such that the next round of fake feedback is more likely to be classified as real invalid feedback.

At operation 206, feedback discriminator trainer 130 receives new feedback from a user. At operation 208, feedback discriminator trainer 130 classifies the feedback. In some embodiments, deployed discriminator 124 classifies the feedback. In some embodiments, classifying includes determining an intent. In some embodiments, classifying includes determining if the feedback is positive or negative. In some embodiments, classifying includes determined if the feedback is valid or invalid. In some embodiments, the determinations may be made by GAN 132. In some embodiments, the determinations are based on the training of operation 204. In some embodiments, the determinations are based on the updated ground truth of operation 218.

At operation 210, feedback discriminator trainer 130 determines if the new feedback is negative. If the new feedback is determined to be negative (210:YES), then feedback discriminator trainer 130 proceeds to operation 212. I If the new feedback is determined to be positive (not negative) (210:NO), then feedback discriminator trainer 130 proceeds to operation 220.

At operation 212, feedback discriminator trainer 130 determines if the new feedback is positive. If the new feedback is determined to be valid (212:YES), then feedback discriminator trainer 130 proceeds to operation 214. If the new feedback is determined to be invalid (not valid) (212:NO), then feedback discriminator trainer 130 proceeds to operation 220.

At operation 214, feedback discriminator trainer 130 generates a confidence score. In some embodiments, the confidence score represents the likelihood that the new feedback is valid and/or negative. In some embodiments, there is a first confidence score for validity, a second confidence score for negativity, and/or a third confidence score for overall. In some embodiments, the overall confidence score may be based on the negativity and the validity confidence scores. The negativity and the validity confidence score may be weighted in any fashion to determine to overall confidence score. In some embodiments, the confidence scores are generated by GAN 132.

At operation 216, feedback discriminator trainer 130 determines if the confidence score is above a threshold. The threshold may be defined by the SME. In some embodiments, the threshold is dynamic. For example, as GAN 132 is trained and further incorporates feedback the threshold may increase. If the confidence score is determined to be above the threshold (216:YES), then feedback discriminator trainer 130 proceeds to operation 218. If the confidence score is determined to not be above the threshold (216:NO), then feedback discriminator trainer 130 proceeds to operation 220.

At operation 218, feedback discriminator trainer 130 adds the new feedback to the ground truth. In some embodiments, ground truth is an updated set of the training data. In some embodiments, the ground truth is used to update and/or re-train GAN 132. The ground truth (or updated training data) allows generator 134 to generate fake feedback that is more likely to be classified as real by discriminator 136.

At operation 220, feedback discriminator trainer 130 processes the feedback. In some embodiments, the processing is based on the determination made by GAN 132. In some embodiments, processing includes deleting the feedback. For example, if the feedback is determined to be irrelevant, it may serve no useful purpose and be deleted. In some embodiments, the feedback is stored. All feedback may be stored in feedback repository 126. This may make available to a SME to develop additional training data, or to check/verify the GAN is working correctly. In some embodiment operation 220 includes transferring (or sending) an updated copy of the discriminator to feedback system 122. Said differently, deployed discriminator 114 is updated to be consistent with the updated discriminator 136.

In some embodiments, operation 220 includes displaying results. The results (e.g., new feedback), may be displayed to the user, to a system administrator, and/or to any other entity/person/user. In some embodiments, the results may include one or more instances of received feedback including validity and/or negativity values determined by deployed discriminator 124 (or GAN 132). This may allow the administrator to evaluate performance of deployed discriminator 124. In some embodiments, the administrator verifies GAN 132 and/or the ground truth is working correctly.

Figure 3:
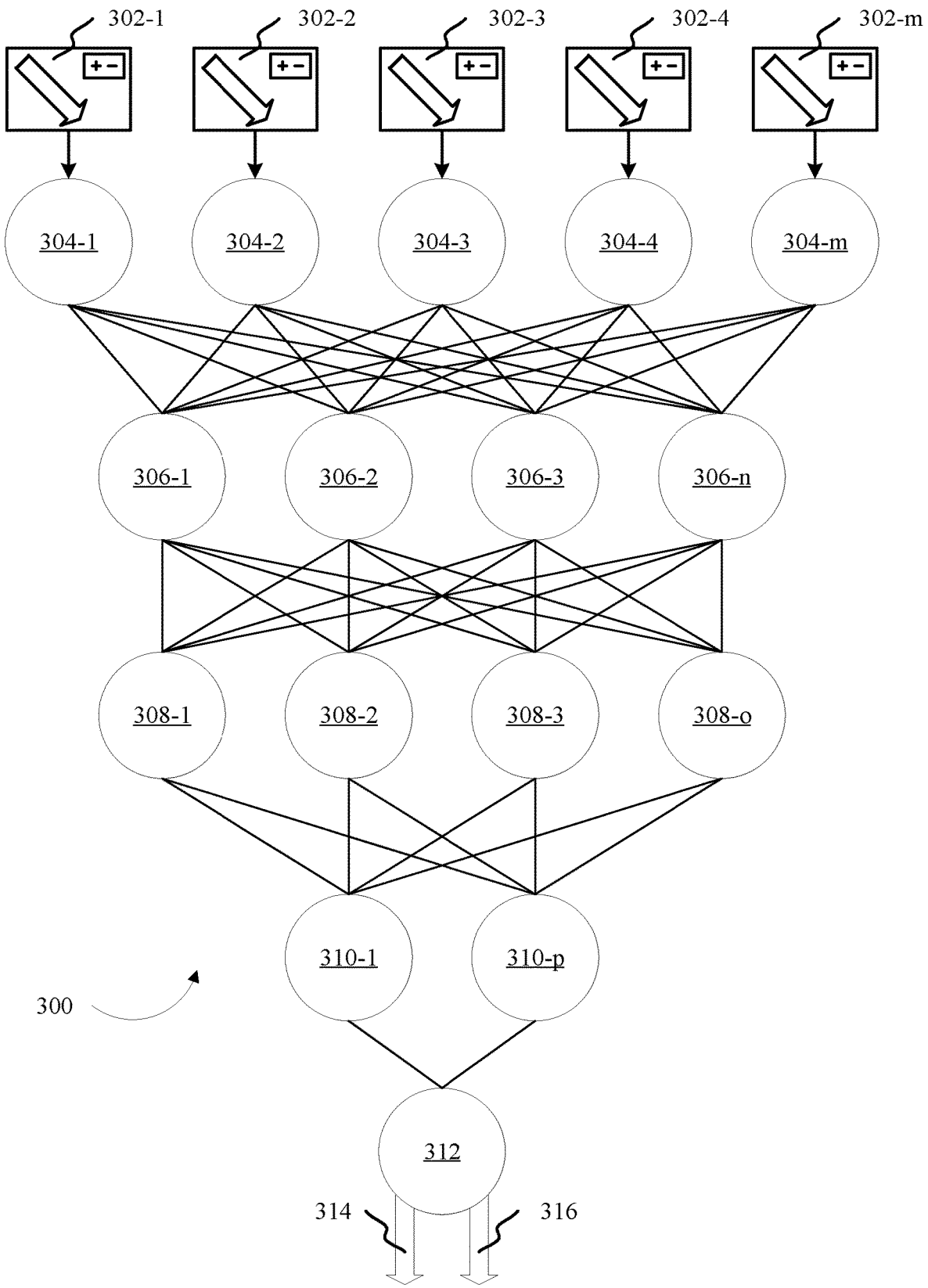
FIG. 3 depicts an example neural network that can be specialized to predict types of relevant negative feedback, in accordance with embodiments of the present disclosure.

FIG. 3 depicts an example neural network 300 that can be in included in a generative adversarial network configured to identify valid negative feedback in real time. For example, neural network 300 can be specialized to perform some or all of the operations of method 200.

Neural network 300 can be a classifier-type neural network, or convolutional neural network. Neural network 300 can be part of a larger neural network. For example, neural network 300 can be nested within a single, larger neural network, connected to several other neural networks, or connected to several other neural networks as part of an overall aggregate neural network.

Inputs 302-1 through 302-$m$ represent the inputs to neural network 300. In this embodiment, inputs 302-1 through 302-$m$ do not necessarily represent different inputs. Rather, inputs 302-1 through 302-$m$ represent the same input that is sent to each first-layer neuron (neurons 304-1 through 304-$m$) in neural network 300. In some embodiments, the number of inputs 302-1 through 302-$m$ (i.e., the number represented by m) can equal (and thus be determined by) the number of first-layer neurons in the network. In other embodiments, neural network 300 can incorporate 1 or more bias neurons in the first layer, in which case the number of inputs 302-1 through 302-$m$ can equal the number of first-layer neurons in the network minus the number of first-layer bias neurons.

In some embodiments, a single input (e.g., input 302-1) can be input into the neural network. In such an embodiment, the first layer of neural network 300 can comprise a single neuron 302, which can propagate the input to the second layer of neurons. In some embodiments, the inputs 302-1 through 302-$m$ are each a plurality of training data configured to train feedback discriminator trainer 130 to identify relevant negative feedback.

Inputs 302-1 through 302-$m$ can comprise one or more values correlating to one or more instances of feedback. Neural network 300 comprises five layers of neurons (referred to as layers 304, 306, 308, 310, and 312, respectively corresponding to illustrated nodes 304-1 to 304-$m$, nodes 306-1 to 306-$n$, nodes 308-1 to 308-$o$, nodes 310-1 to 310-$p$, and node 312). In some embodiments, neural network 300 can have more than 5 layers or fewer than 5 layers. Each layer can comprise the same number of neurons as any other layer, more neurons than any other layer, fewer neurons than any other layer, or more neurons than some layers and fewer neurons than other layers.

In the embodiment illustrated in FIG. 3, layer 312 is treated as the output layer. Layer 312 can output a probability and/or a confidence score (e.g., likelihood an instance of feedback is relevant and negative). In the embodiment illustrated in FIG. 3, no bias neurons are shown in neural network 300. However, in some embodiments, each layer in neural network 300 can contain one or more bias neurons. Although layer 312 is shown having one output neuron (node 312), in other embodiments, layer 312 contains more than one output neuron.

Layers 304-312 can each comprise an activation function. The activation function utilized can be, for example, a rectified linear unit (ReLU) function, a SoftPlus function, a Soft step function, or others. Each layer can use the same activation function but can also transform the input or output of the layer independently of, or dependent upon, the ReLU function. This is also true in embodiments with more or fewer layers than are illustrated here.

Layer 312 is the output layer. In this embodiment, neuron 312 produces outputs 314 and 316. Outputs 314 and 316 represent complementary probabilities that a target event will or will not occur. In some embodiments, outputs 314 and 316 represent one or more of the confidence scores. In some embodiments, there is an output node for each confidence score (e.g., relevance, positivity, and overall). In some embodiments, there is an output node for the overall confidence score. In some embodiments, outputs 314 and 316 can each be between 0.0 and 1.0 and can add up to 1.0. In such embodiments, a probability of 1.0 can represent a projected absolute certainty (e.g., if output 314 were 1.0, the projected chance that the target event would occur would be 100%, whereas if output 316 were 0.0, the projected chance that the target event would not occur would be 100%).

In some embodiments, generator 134 and discriminator 136 are separate neural networks. The output of each network may be an input to the other. In some embodiments, generator 134 and discriminator 136 are combined into a single neural network. Then they may have common inputs and outputs, but interact through the various nodes of the various layers of the neural network.

Figure 4:
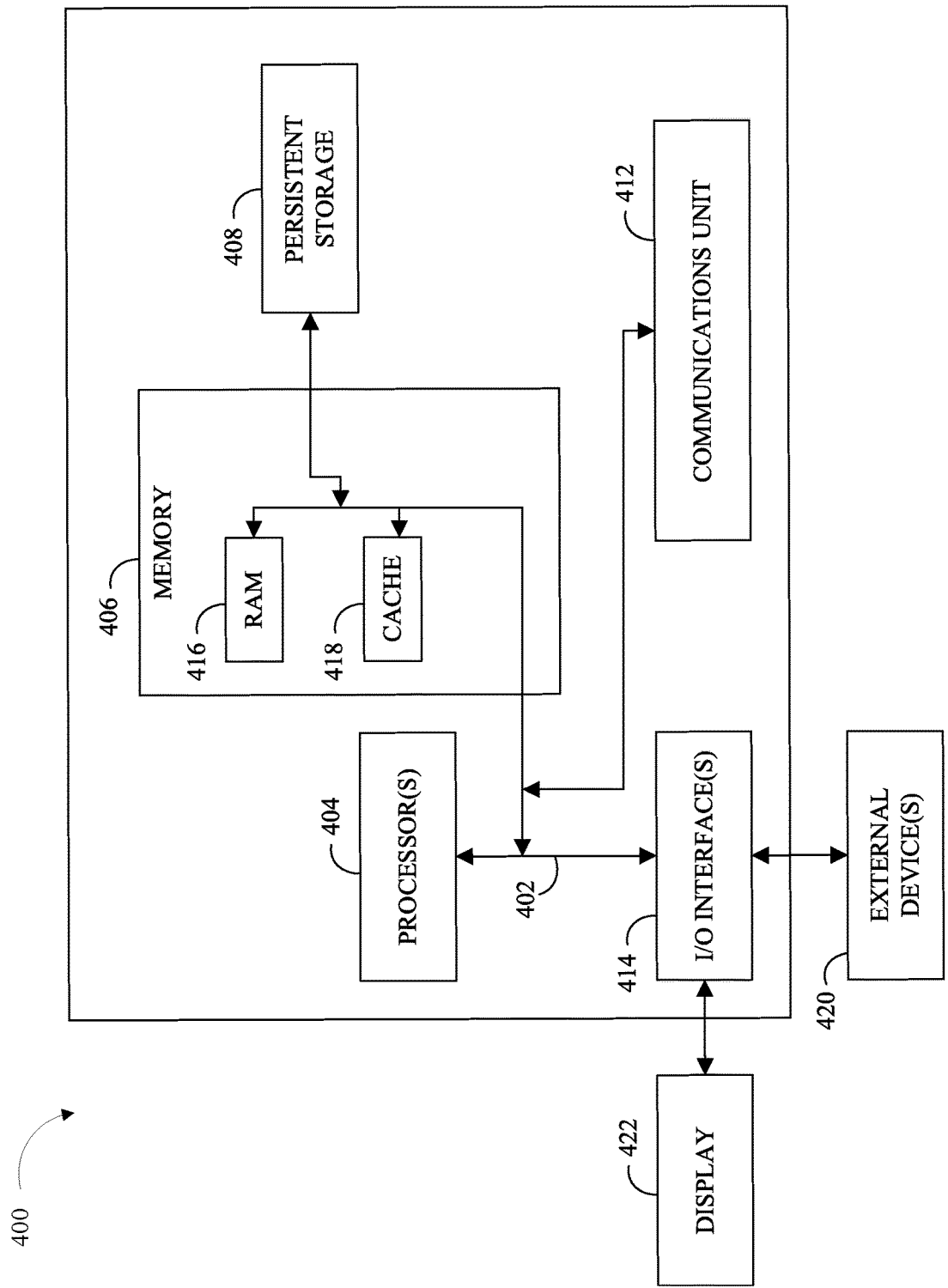
FIG. 4 illustrates a block diagram of an example computer system capable of operating a feedback discriminator, in accordance with embodiments of the present disclosure.

FIG. 4 is a block diagram depicting components of a computer 400 suitable for operation of a feedback discriminator in accordance with at least one embodiment of the present disclosure. In an embodiment, computer 400 is representative of host 110, feedback discriminator trainer 130, and/or user device 140. FIG. 4 displays the computer 400, one or more processor(s) 404 (including one or more computer processors), a communications fabric 402, a memory 406 including, a RAM 416, and a cache 418, a persistent storage 408, a communications unit 412, I/O interfaces 414, a display 422, and external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over the communications fabric 402, which provides communications between the computer processor(s) 404, memory 406, persistent storage 408, communications unit 412, and input/output (I/O) interface(s) 414. The communications fabric 402 may be implemented with any architecture suitable for passing data or control information between the processors 404 (e.g., microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a random access memory (RAM) 416 and a cache 418. In general, the memory 406 may comprise any suitable volatile or non-volatile one or more computer readable storage media.

Program instructions for host 110, feedback discriminator trainer 130, and/or user device 140 may be stored in the persistent storage 408, or more generally, any computer readable storage media, for execution by one or more of the respective computer processors 404 via one or more memories of the memory 406. The persistent storage 408 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the various input data may be physically remote to the computer 400 such that the input data may be received and the output similarly transmitted via the communications unit 412.

The I/O interface(s) 414 allow for input and output of data with other devices that may operate in conjunction with the computer 400. For example, the I/O interface 414 may provide a connection to the external devices 420, which may be as a keyboard, keypad, a touch screen, or other suitable input devices. External devices 420 may also include portable computer readable storage media, for example thumb drives, portable optical or magnetic disks, and memory cards. Software and data used to practice embodiments of the present invention may be stored on such portable computer readable storage media and may be loaded onto the persistent storage 408 via the I/O interface(s) 414. The I/O interface(s) 414 may similarly connect to a display 422. The display 422 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
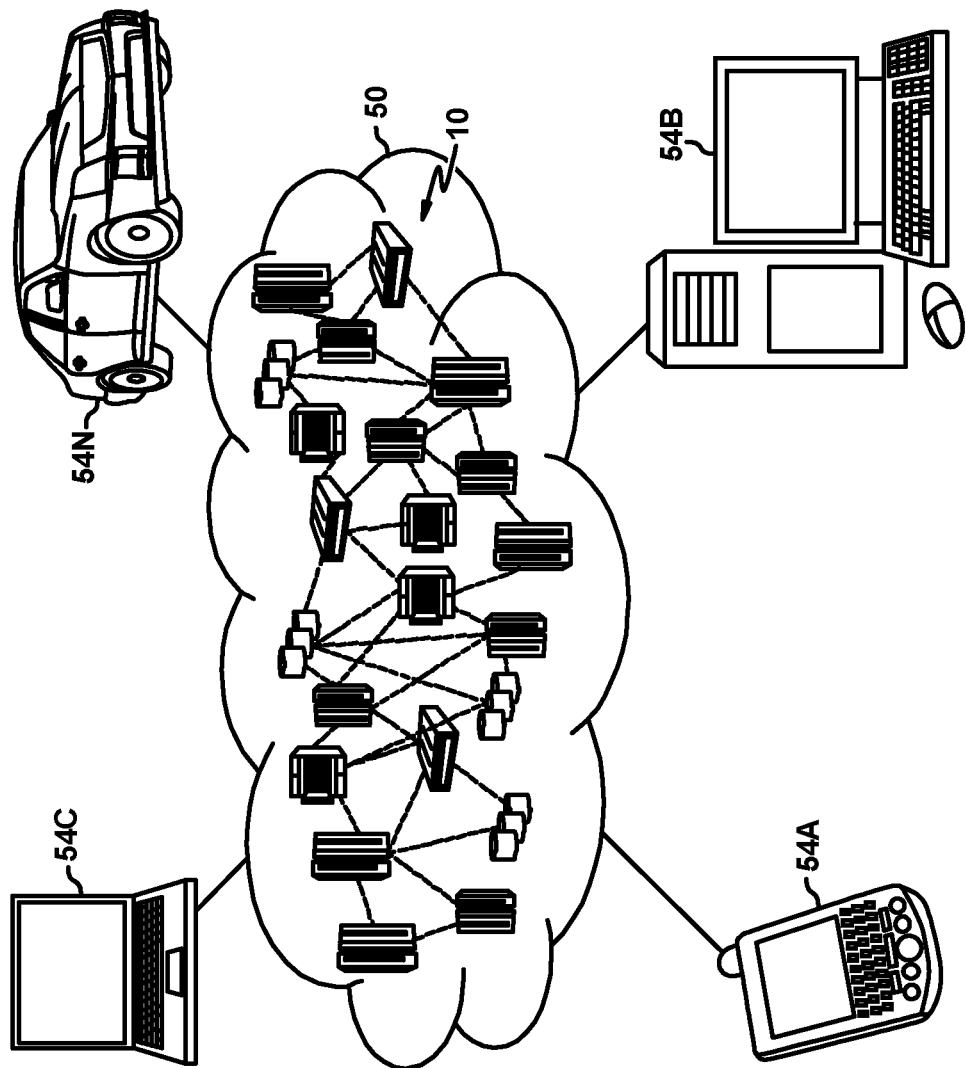
FIG. 5 depicts a cloud computing environment, in accordance with some embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 6:
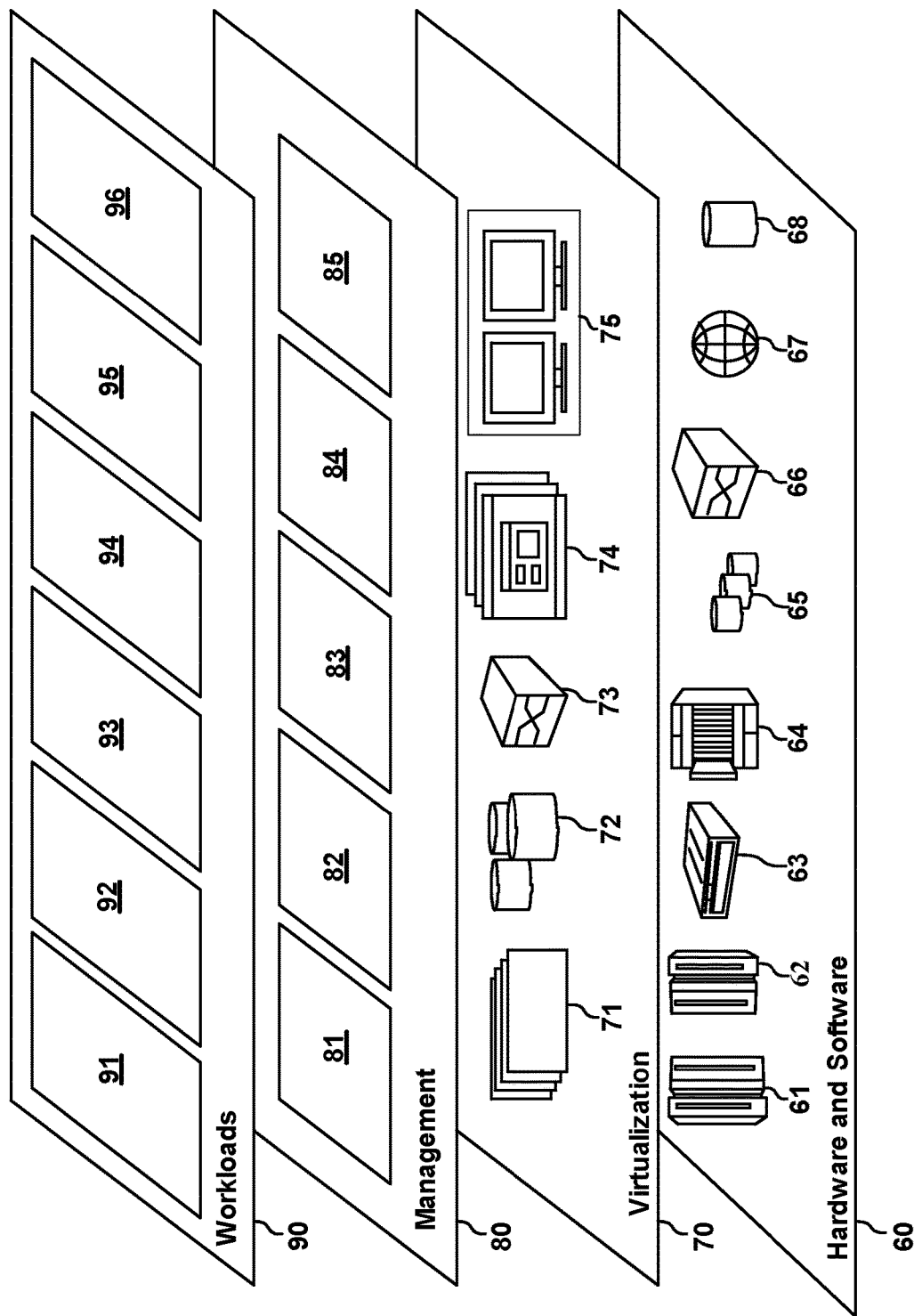
FIG. 6 depicts abstraction model layers, in accordance with some embodiments of the present disclosure.

Referring now to FIG. 6, a set of functional abstraction layers provided by cloud computing environment 50 (FIG. 5) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and feedback discriminating 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
training, with a set of training data, a generative adversarial network (GAN), wherein the GAN includes a generator and a discriminator, and the set of training data is comprised of a plurality of feedback, each instance of feedback includes a value in a plurality of categories, the categories including a positivity value, and a validity value, and the GAN is used by a chatbot to interact with a user;
receiving, in response to the training and by the chatbot, an input from the user;
determining, by the chatbot and in response to receiving the input from the user, an intent of the input;
generating, by the chatbot, a response to the input based on the intent;
receiving, from the user during an interaction with the chatbot and in response the receiving the input and the generating the response, a new instance of feedback, wherein the new instance of feedback is based on the intent and the response;
determining, by the discriminator, a first validity value and a first positivity value of the new instance of feedback, wherein the first validity value represents a likelihood the new instance of feedback is relevant to the input and the first positivity value represents a likelihood the chatbut misunderstood the input;
updating, in response to the first validity value being valid, and the first positivity value being negative, the GAN, wherein the first positivity value being negative indicates the chatbot did misunderstand the input; and
displaying the new instance of feedback.

2. The method of claim 1, wherein updating the GAN comprises:
adding the new instance to a ground truth, wherein the ground truth includes the set of training data.

3. The method of claim 2, further comprising:
receiving, from a second user, a second new instance of feedback;
determining, for the second new instance of feedback, by the discriminator, using the set of training data, the positivity value is negative, and the validity value is invalid; and
determining, in response to adding the new instance to the ground truth, for the second new instance of feedback, by the discriminator, using the ground truth, a second positivity value is negative, and a second validity value is valid.

4. The method of claim 1, wherein the generator is trained by a first subset of the set of training data, the first subset comprising feedback from the set of training data where each validity value is invalid.

5. The method of claim 4, wherein the discriminator is trained by a second subset of the set of training data, the second subset comprising feedback from the set of training data where each validity value is valid.

6. The method of claim 5, wherein the discriminator is further trained by an output of the generator, wherein the output of the generator includes a fake feedback created by the generator.

7. The method of claim 1, wherein the plurality of feedback is obtained from the user using a chatbot.

8. The method of claim 1, further comprising:
deleting, a third instance of new feedback in response to the GAN determining the positivity value of the third instance of new feedback is positive.

9. The method of claim 1, further comprising:
deleting, a fourth instance of new feedback in response to the GAN determining the validity value of the fourth instance of new feedback is irrelevant.

10. The method of claim 1, wherein the method is performed by a feedback system, executing program instructions, and wherein the program instructions are downloaded from a remote data processing system.

11. A system comprising:
a processor; and
a computer-readable storage medium communicatively coupled to the processor and storing program instructions which, when executed by the processor, are configured to cause the processor to:
train, with a set of training data, a generative adversarial network (GAN), wherein the GAN includes a generator and a discriminator, and the set of training data is comprised of a plurality of feedback, each instance of feedback includes a value in a plurality of categories, the categories including a positivity value, and a validity value, and the GAN is used by a chatbot to interact with a user;
receive, in response to the training and by the chatbot, an input from the user;
determine, by the chatbot and in response to receiving the input from the user, an intent of the input;
generate, by the chatbot, a response to the input based on the intent;
receive, from the user during an interaction with the chatbot and in response the receiving the input and the generating of the response, a new instance of feedback, wherein the new instance of feedback is based on the intent and the response;
determine, by the GAN, a first validity value and a first positivity value of the new instance of feedback, wherein the first validity value represents a likelihood the new instance of feedback is relevant to the input and the first positivity value represents a likelihood the chatbot misunderstood the input;
update, in response to the first validity value being valid, and the first positivity value being negative, the GAN, wherein the first positivity value being negative indicates the chatbot did misunderstand the input; and
display the new instance of feedback.

12. The system of claim 11, wherein updating the GAN comprises:
adding the new instance to a ground truth, wherein the ground truth includes the set of training data.

13. The system of claim 12, wherein the program instructions are further configured to cause the processor to:
receive, from a second user, a second new instance of feedback;
determine, for the second new instance of feedback, by the discriminator, using the set of training data, the positivity value is negative, and the validity value is invalid; and
determine, in response to adding the new instance to the ground truth, for the second new instance of feedback, by the discriminator, using the ground truth, a second positivity value is negative, and a second validity value is valid.

14. The system of claim 11, wherein the generator is trained by a first subset of the set of training data, the first subset comprising feedback from the set of training data where each validity value is invalid.

15. The system of claim 14, wherein the discriminator is trained by a second subset of the set of training data, the second subset comprising feedback from the set of training data where each validity value is valid.

16. A computer program product, the computer program product comprising a computer readable storage medium having program instructions embodied therewith, the program instructions executable by a processing unit to cause the processing unit to:
train, with a set of training data, a generative adversarial network (GAN), wherein the GAN includes a generator and a discriminator, and the set of training data is comprised of a plurality of feedback, each instance of feedback includes a value in a plurality of categories, the categories including a positivity value, and a validity value, and the GAN is used by a chatbot to interact with a user;
receive, in response to the training and by the chatbot, an input from the user;
receive, from a user, a new instance of feedback;
determine, by the chatbot and in response to receiving the input from the user, an intent of the input;
generate, by the chatbot, a response to the input based on the intent;
receive, from the user during an interaction with the chatbot and in response the receiving the input and the generating of the response, a new instance of feedback, wherein the new instance of feedback is based on the intent and the response;
determine, by the GAN, a first validity value and a first positivity value of the new instance of feedback, wherein the first validity value represents a likelihood the new instance of feedback is relevant to the input and the first positivity value represents a likelihood the chatbot misunderstood the input;
update, in response to the first validity value being valid, and the first positivity value being negative, the GAN, wherein the first positivity value being negative indicates the chatbot did misunderstand the input; and
display the new instance of feedback.

17. The computer program product of claim 16, wherein updating the GAN comprises:
adding the new instance to a ground truth, wherein the ground truth includes the set of training data; and
retraining the GAN.

18. The computer program product of claim 17, wherein the program instructions are further configured to cause the processing unit to:
receive, from a second user, a second new instance of feedback;
determine, for the second new instance of feedback, by the discriminator, using the set of training data, the positivity value is negative, and the validity value is invalid; and determine, in response to adding the new instance to the ground truth, for the second new instance of feedback, by the discriminator, using the ground truth, a second positivity value is negative, and a second validity value is valid.

19. The computer program product of claim 16, wherein the generator is trained by a first subset of the set of training data, the first subset comprising feedback from the set of training data where each validity value is invalid.

20. The computer program product of claim 19, wherein the discriminator is trained by a second subset of the set of training data, the second subset comprising feedback from the set of training data where each validity value is valid.

\* \* \* \* \*